US012687454B2

(12) United States Patent
Delin et al.

(10) Patent No.: US 12,687,454 B2
(45) Date of Patent: Jul. 21, 2026

(54) VIBRATION ESTIMATION SYSTEM AND METHOD

(71) Applicant: Rosemount Tank Radar AB, Mölnlycke (SE)

(72) Inventors: Håkan Delin, Linköping (SE);
Lars-Ove Larsson, Linköping (SE);
Carl Fjelkner, Mölnlycke (SE);
Christoffer Widahl, Västra Frölunda (SE)

(73) Assignee: ROSEMOUNT TANK RADAR AB, Mölnlycke (SE)

( * ) Notice: Subject to any disclaimer, the term of this patent is extended or adjusted under 35 U.S.C. 154(b) by 296 days.

(21) Appl. No.: 18/536,774

(22) Filed: Dec. 12, 2023

(65) Prior Publication Data

US 2024/0219259 A1 Jul. 4, 2024

(30) Foreign Application Priority Data

Jan. 2, 2023 (EP) ..................................... 23150018

(51) Int. Cl.
*G01H 9/00* (2006.01)
*G01H 17/00* (2006.01)
*G01M 7/02* (2006.01)

(52) U.S. Cl.
CPC .............. *G01M 7/025* (2013.01); *G01H 9/00* (2013.01)

(58) Field of Classification Search
CPC .......... G01H 9/00; G01H 11/00; G01H 17/00; G01M 7/02; G01M 7/025
See application file for complete search history.

(56) References Cited

U.S. PATENT DOCUMENTS 10,006,988 B2 * 6/2018 Giunta .................. G01S 7/4052
2021/0197834 A1 7/2021 Shaker et al.
2022/0187158 A1 6/2022 Peng et al.

FOREIGN PATENT DOCUMENTS

GB         2310099 A  * 8/1997  ............. G01V 1/001
WO    WO 2022/238617      11/2022
WO    WO-2023201941 A1 * 10/2023  ............. G01B 15/06

OTHER PUBLICATIONS

Machine Translation of WO-2023201941-A1 (Year: 2023).*
(Continued)

*Primary Examiner* — Nguyen Q. Ha
(74) *Attorney, Agent, or Firm* — Westman, Champlin & Koehler, P.A.

(57) ABSTRACT

A method of estimating vibration of a target, comprising performing a first sequence of a predefined first number of distance data acquisition operations, consecutive distance data acquisition operations being separated by a predefined first separation time period, each data acquisition operation resulting in a measurement data set, being a representation of measurement signal, in a memory; accessing from the memory, the measurement data set for each distance data acquisition operation; determining a first sequence of distance variation values indicative of a variation over time of a distance between a vibration estimation system and the target, based on the measurement data set for each distance data acquisition operation of the first number of distance data acquisition operations; and estimating a first indicator of vibration of the target based on the first sequence of distance variation values.

12 Claims, 8 Drawing Sheets

(56)  References Cited

OTHER PUBLICATIONS

"Evaluation of FMCW Radar for Vibration Sensing in Industrial Environments", by C. Zeintl et al., 2019 29th International Conference Radioelektronika, IEEE, Apr. 16, 2019, pp. 1-5.
"Introduction to mmwave Sensing: FMCW Radars", bu S. Rao, Texas Instruments, Apr. 28, 2017, pp. 1-70.
Extended Search Report from European Patent Application No. 23150018.2, dated Jun. 1, 2023.

* cited by examiner

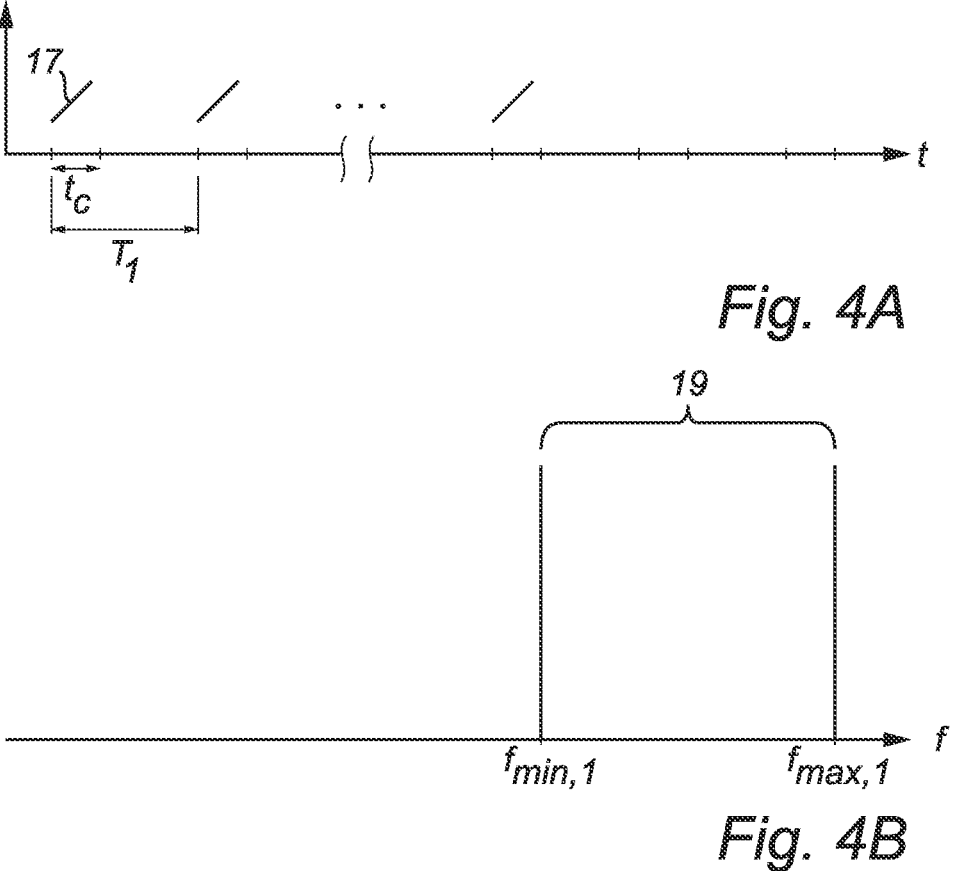
Fig. 4A
Fig. 4B
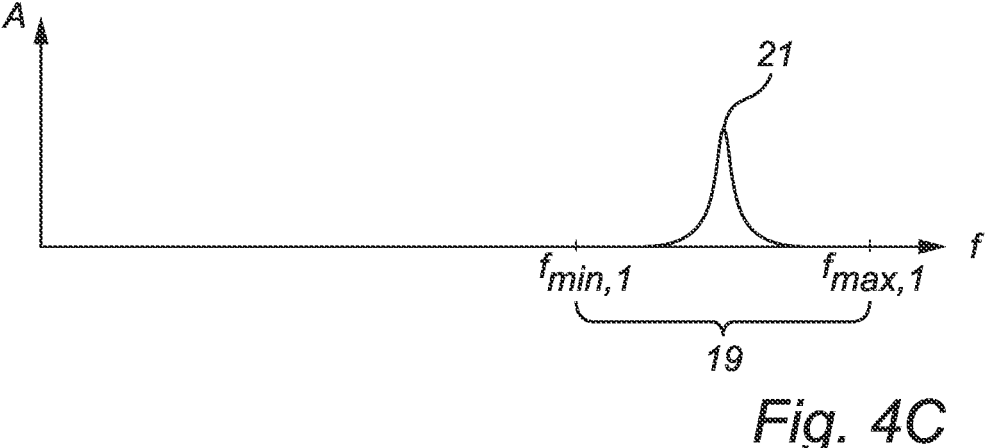
Fig. 4C

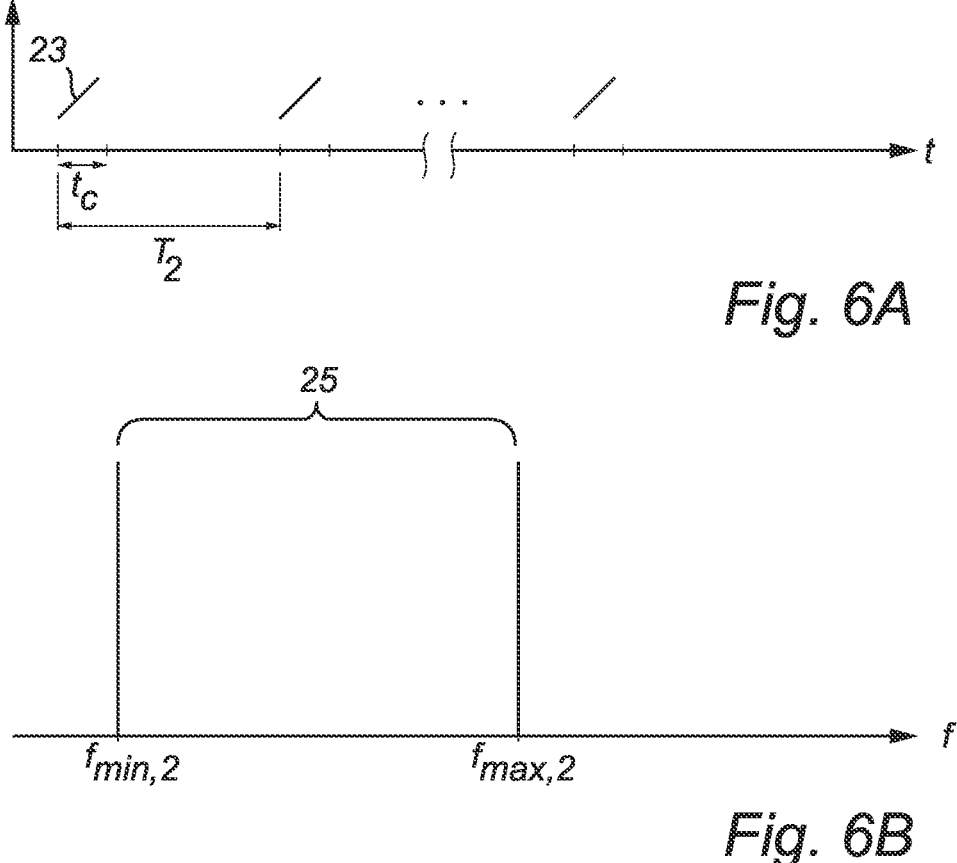
*Fig. 6A*
*Fig. 6B*
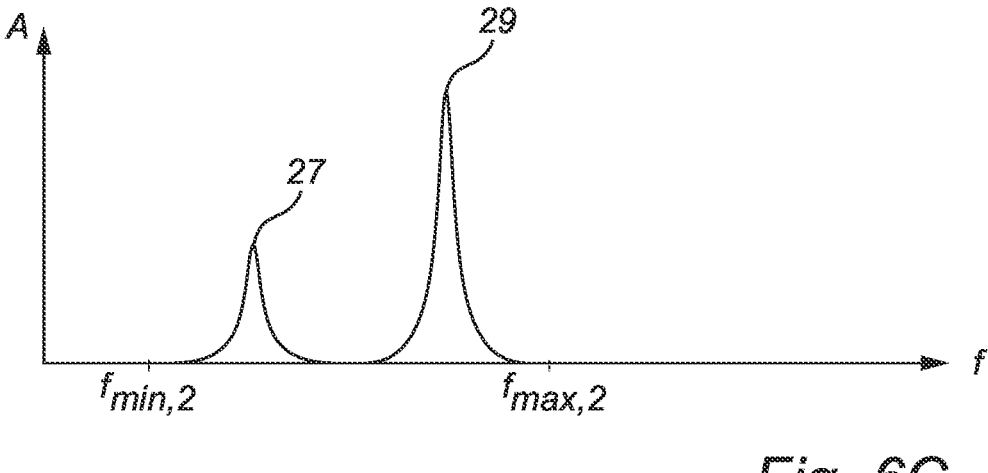
*Fig. 6C*

VIBRATION ESTIMATION SYSTEM AND METHOD

CROSS-REFERENCE TO RELATED APPLICATION

This application claims priority to European Patent Application No. 23150018.2, filed Jan. 2, 2023, the content of which is hereby incorporated by reference in its entirety.

TECHNICAL FIELD OF THE INVENTION

The present invention relates to a method of estimating vibration of a target, and to a vibration estimation system.

TECHNICAL BACKGROUND

Vibration monitoring of various installations, such as pipes or various machinery is used to obtain indications of the state of a process or the installations themselves.

For vibration monitoring, it is known to use accelerometers attached to targets to be monitored.

To overcome drawbacks of installations with permanently mounted accelerometers, it has been proposed to use radar techniques for contactless estimation of vibrations.

It would be desirable to provide for improved contactless vibration estimation, in particular providing for energy-efficient estimation of high vibration frequencies, such as vibrations frequencies higher than about 1 kHz.

SUMMARY OF THE INVENTION

In view of the above, a general object of the present invention is to provide for improved contactless vibration estimation, in particular providing for energy-efficient estimation of high vibration frequencies, such as vibrations frequencies higher than about 1 KHz.

According to a first aspect of the present invention, it is therefore provided a method of estimating vibration of a target, comprising: performing a first sequence of a predefined first number of distance data acquisition operations, consecutive distance data acquisition operations being separated in time by a predefined first separation time period, each data acquisition operation including: generating and transmitting towards the target, by a transceiver comprised in a vibration estimation system, an electromagnetic transmit signal exhibiting a time-varying frequency; receiving, by the transceiver comprised in the vibration estimation system, an electromagnetic reflection signal resulting from reflection of the transmit signal at the target; forming, by signal processing circuitry comprised in the vibration estimation system, a measurement signal indicative of a difference between the transmit signal and the reflection signal; and storing a measurement data set, being a representation of the measurement signal, in a memory comprised in the vibration estimation system; accessing from the memory comprised in the vibration estimation system, by processing circuitry comprised in the vibration estimation system after having performed the first number of distance data acquisition operations, the measurement data set for each distance data acquisition operation of the first number of distance data acquisition operations; determining, by the processing circuitry comprised in the vibration estimation system, a first sequence of distance variation values indicative of a variation over time of a distance between the transceiver and the target, based on the measurement data set for each distance data acquisition operation of the first number of distance data acquisition operations; and estimating, by the processing circuitry comprised in the vibration estimation system, a first indicator of the vibration of the target based on the first sequence of distance variation values.

The present invention is based on the realization that although the development of fast, compact, and energy-efficient radar systems, primarily driven by the needs of the automotive industry, has made it possible to accurately estimate vibration with frequencies up to a few hundred Hz, such systems cannot provide distance variation values fast enough to yield reliable information about vibration with higher frequencies than that.

The present inventor has further realized that this problem can be solved by dividing the procedure of providing distance variation values in one data acquisition part and one data processing part, and performing a sequence of distance data acquisition operations before starting to process the measurement data resulting from the sequence of distance data acquisition operations.

Hereby, the time between consecutive distance data acquisition operations can be made considerably shorter than the time needed for processing the measurement data set resulting from a distance data acquisition operation. This shorter time between consecutive distance data acquisition operations corresponds to an increased sampling frequency, which in turn allows accurate estimation of higher vibration frequencies, in accordance with the generally known Nyquist theorem.

If the first number of distance data acquisition operations is sufficiently large, and using a sufficiently short time in view of the desired maximum vibration frequency to evaluate, lower vibration frequencies can also be accurately evaluated. It may, however, be beneficial to limit the first number of distance data acquisition operations, due to, for example, constraints in respect of energy consumption and/or storage capacity in the memory of the vibration estimation system. The result of the first sequence of distance data acquisition operations, and the subsequent processing, may then be accurate for relatively high vibration frequencies, but inaccurate for relatively low vibration frequencies. The reason for the inaccurate estimation for relatively low vibration frequencies is that the total time of the first sequence of distance data acquisition operations may be too short in view of the period time for the relatively low frequency vibrations.

According to various embodiments, the method according to the present invention may therefore comprise: performing a second sequence of a second number of distance data acquisition operations, consecutive distance data acquisition operations being separated in time by a predefined second separation time period, longer than the first separation time period, each data acquisition operation including: generating and transmitting towards the target, by the transceiver comprised in the vibration estimation system, an electromagnetic transmit signal exhibiting a time-varying frequency; receiving, by the transceiver comprised in the vibration estimation system, an electromagnetic reflection signal resulting from reflection of the transmit signal at the target; forming, by the signal processing circuitry comprised in the vibration estimation system, a measurement signal indicative of a difference between the transmit signal and the reflection signal; and storing a measurement data set, being a representation of the measurement signal, in the memory comprised in the vibration estimation system; accessing from the memory comprised in the vibration estimation system, by the processing circuitry comprised in the vibration estimation system after having performed the second number of distance data acquisition operations, the measurement data set for each distance data acquisition operation of the second number of distance data acquisition operations; determining, by the processing circuitry comprised in the vibration estimation system, a second sequence of distance variation values indicative of a variation over time of a distance between the transceiver and the target, based on the measurement data set for each distance data acquisition operation of the second number of distance data acquisition operations; and estimating, by the processing circuitry comprised in the vibration estimation system, a second indicator of the vibration of the target based on the second sequence of distance variation values.

Alternatively, the second separation time period may be shorter than the first separation time period, so that vibrations with relatively low vibration frequencies are accurately estimated using the first sequence of distance data acquisition operations, and vibrations with relatively high vibration frequencies are accurately estimated using the second sequence of distance data acquisition operations.

According to embodiments, the method of the present invention may comprise determining, by the processing circuitry comprised in the vibration estimation system, a combined indicator of the vibration of the target based on the first sequence of distance variation values and the second sequence of distance variation values.

This combined indicator may comprise accurate estimations across a broader spectrum of vibration frequencies, allowing improved monitoring and/or diagnostics of the target.

As an alternative or complement, results of the first sequence of distance data acquisition operations and the second sequence of distance data acquisition operations may be a basis for optimizing the separation time and/or the number of distance data acquisition operations for the vibration behavior of the particular target.

According to embodiments, the method may therefore comprise determining a third separation time period based on the first indicator of the vibration of the target and the second indicator of the vibration of the target; performing a third sequence of a predefined third number of distance data acquisition operations, consecutive distance data acquisition operations being separated in time by the third separation time period, each data acquisition operation including: generating and transmitting towards the target, by the transceiver comprised in the vibration estimation system, an electromagnetic transmit signal exhibiting a time-varying frequency; receiving, by the transceiver comprised in the vibration estimation system, an electromagnetic reflection signal resulting from reflection of the transmit signal at the target; forming, by the signal processing circuitry comprised in the vibration estimation system, a measurement signal indicative of a difference between the transmit signal and the reflection signal; and storing a measurement data set, being a representation of the measurement signal, in the memory comprised in the vibration estimation system; accessing from the memory comprised in the vibration estimation system, by the processing circuitry comprised in the vibration estimation system after having performed the third number of distance data acquisition operations, the measurement data set for each distance data acquisition operation of the third number of distance data acquisition operations; determining, by the processing circuitry comprised in the vibration estimation system, a third sequence of distance variation values indicative of a variation over time of a distance between the transceiver and the target, based on the measurement data set for each distance data acquisition operation of the third number of distance data acquisition operations; and estimating, by the processing circuitry comprised in the vibration estimation system, a third indicator of the vibration of the target based on the third sequence of distance variation values.

According to embodiments, the method may comprise determining, by the vibration estimation system, a distance between the transmitter and the target, based on the measurement signal of at least one of the distance data acquisition operations.

In embodiments, the distance to each target of a plurality of targets may be determined, and at least one vibration indicator may be estimated for each of the targets, using any of the methods described herein for one target. By including distance measurements to each target in a plurality of targets, the targets can conveniently be distinguished from each other, and the vibration behavior of each target can be estimated separately, without the need for controlling the direction of transmission of the electromagnetic transmit signal used in the distance data acquisition operations. This allows for the use of relatively simple equipment, without mechanical or electrical scanning of the transmitted radar beam.

In various embodiments, the measurement signal formed in each distance data acquisition operation may be indicative of at least a phase difference between the transmit signal and the reflection signal. Analysis of the phase difference between the reflection signal and the transmit signal can provide considerably higher accuracy (in the order of tenths of a micron or better for typical frequency ranges and measurement sweep configurations) than analysis of the frequency difference between the reflection signal and the transmit signal (in the order of tenths of a mm for typical frequency ranges and measurement sweep configurations).

For this measurement technique, CW (continuous wave) or FMCW (frequency modulated continuous wave) radar systems may be used. Such radar systems are, per se, well-known to one of ordinary skill in the art.

In conventional contactless filling level determination systems using FMCW-techniques, phase information is generally not used, because the relation between the phase information and distance is not unambiguous for typical distance ranges. The present inventor has realized that this is not a problem for vibration estimation, because the vibration amplitude is generally so small that the distance variation over time can be unambiguously determined using the more accurate phase difference measurement.

According to a second aspect of the present invention, it is provided a vibration estimation system, for estimating vibration of a target, the vibration estimation system comprising: distance data acquisition circuitry, including: a transceiver configured to generate and transmit an electromagnetic transmit signal exhibiting a time-varying frequency, and to receive an electromagnetic reflection signal resulting from reflection of the transmit signal at a target; signal processing circuitry configured to form a measurement signal indicative of a difference between the transmit signal and the reflection signal; and a memory configured to store measurement data set, being a representation of the measurement signal, the vibration estimation system further comprising: processing circuitry configured to: control the distance data acquisition circuitry to perform a first sequence of a predefined first number of distance data acquisition operations, consecutive distance data acquisition operations being separated in time by a predefined first separation time period; access from the memory the measurement data set for each distance data acquisition operation of the first number of distance data acquisition operations; determine a first sequence of distance variation values indicative of a variation over time of a distance between the transceiver and the target, based on the measurement data set for each distance data acquisition operation of the first number of distance data acquisition operations; and estimate a first indicator of the vibration of the target based on the first sequence of distance variation values.

In summary, the present invention thus relates to a method of estimating vibration of a target, comprising performing a first sequence of a predefined first number of distance data acquisition operations, consecutive distance data acquisition operations being separated in time by a predefined first separation time period, each data acquisition operation resulting in a measurement data set, being a representation of the measurement signal, in a memory; accessing from the memory, the measurement data set for each distance data acquisition operation; determining a first sequence of distance variation values indicative of a variation over time of a distance between the vibration estimation system and the target, based on the measurement data set for each distance data acquisition operation of the first number of distance data acquisition operations; and estimating a first indicator of the vibration of the target based on the first sequence of distance variation values.

BRIEF DESCRIPTION OF THE DRAWINGS

These and other aspects of the present invention will now be described in more detail, with reference to the appended drawings showing an example embodiment of the invention, wherein:

FIG. 4A schematically illustrates transmit signals of a first sequence of distance data acquisition operations;

FIG. 4B schematically illustrates a frequency range where the first sequence of distance data acquisition operations can provide accurate vibration estimation;

FIG. 4C schematically shows an example of a first indicator of the vibration of the target;

FIG. 6A schematically illustrates transmit signals of a second sequence of distance data acquisition operations;

FIG. 6B schematically illustrates a frequency range where the second sequence of distance data acquisition operations can provide accurate vibration estimation;

FIG. 6C schematically shows an example of a second indicator of the vibration of the target;

FIGS. 10A-D schematically illustrate an example of signal processing carried out in a sequence of distance data acquisition operations.

DETAILED DESCRIPTION OF EXAMPLE EMBODIMENTS OF THE INVENTION

Figure 1:
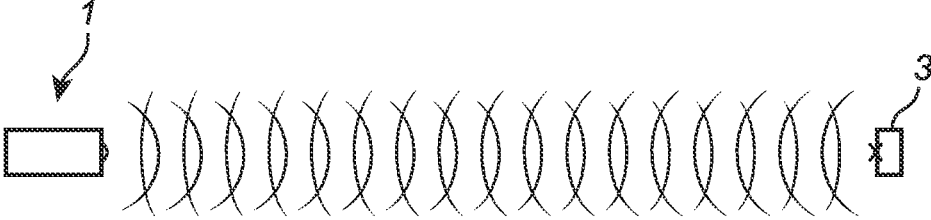
FIG. 1 schematically shows an example embodiment of the vibration estimation system according to the present invention.

FIG. 1 schematically shows an example embodiment of the vibration estimation system 1 according to the present invention, arranged to remotely estimate vibration of a target 3, using contactless measurement. In FIG. 1, the target 3 is represented by a simple box, but it should be understood that the target 3 may be any target for which it may be of interest to estimate the vibration. Examples of targets may include piping and structures in a process facility, machinery, buildings, structures, etc.

Figure 2:
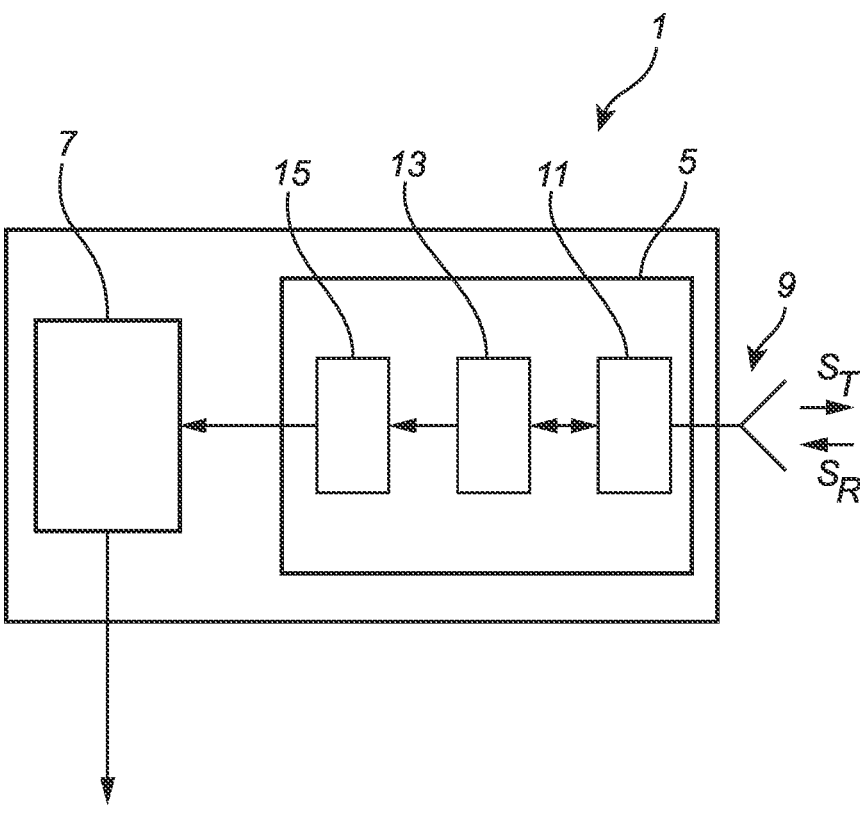
FIG. 2 is a schematic block diagram of an example configuration of the vibration estimation system in FIG. 1.

FIG. 2 is a schematic block diagram of an example configuration of the vibration estimation system 1 in FIG. 1. In this example configuration, the vibration estimation system 1 comprises distance data acquisition circuitry 5, processing circuitry 7, and an antenna arrangement 9. The distance data acquisition circuitry 5 includes a transceiver 11, signal processing circuitry 13, and a memory 15. Although FIG. 2 schematically indicates that the processing circuitry 7 is co-located with the distance data acquisition circuitry 5 and the antenna arrangement 9, it should be understood that this is not necessary, but that part of, or all, the processing required may take place at another location or may be distributed. For example, processing may take place in the cloud and/or in a remote device.

The transceiver 11 is configured to generate and transmit an electromagnetic transmit signal $S_T$ exhibiting a time-varying frequency, and to receive an electromagnetic reflection signal $S_R$ resulting from reflection of the transmit signal $S_T$ at the target 3. The transmit signal $S_T$ may have a carrier frequency higher than 40 GHz, such as higher than 70 GHz. The antenna arrangement 9 is coupled to the transceiver 11 for radiating the transmit signal $S_T$ towards the target 3 and for receiving and returning to the transceiver 11 the reflection signal $S_R$. The signal processing circuitry 13 is coupled to the transceiver 11 and configured to form a measurement signal indicative of a difference between the transmit signal $S_T$ and the reflection signal $S_R$. The signal processing circuitry 13 may be configured to provide a data set, being a representation of the measurement signal, to the memory 15. The memory 15 may be a RAM-type memory.

For the required fast and accurate distance data acquisition operations, at least the above-described distance data acquisition circuitry 5 may advantageously be implemented using a so-called monolithic microwave integrated circuit (MMIC). Furthermore, phase-based processing may be used, rather than frequency-based processing.

For example, the transmit signal $S_T$ and the reflection signal $S_R$ from reflection of the transmit signal $S_T$ at the target 3 may first be combined to form a so-called intermediate frequency signal $S_{IF}$, using techniques that are, per se, well-known in the art of FMCW-type radar level gauge systems.

Thereafter, a phase of the intermediate frequency signal $S_{IF}$ may be determined. According to embodiments of the invention, this may be done by transforming the intermediate frequency signal $S_{IF}$ to the frequency domain, for example using FFT, identifying the frequency difference corresponding to reflection at the particular target 3, and determining the phase of the intermediate frequency signal $S_{IF}$ for this frequency difference. For the small changes in distance resulting from vibration, the change of the phase can be used to unambiguously determine the change in distance with high accuracy.

Figure 3:
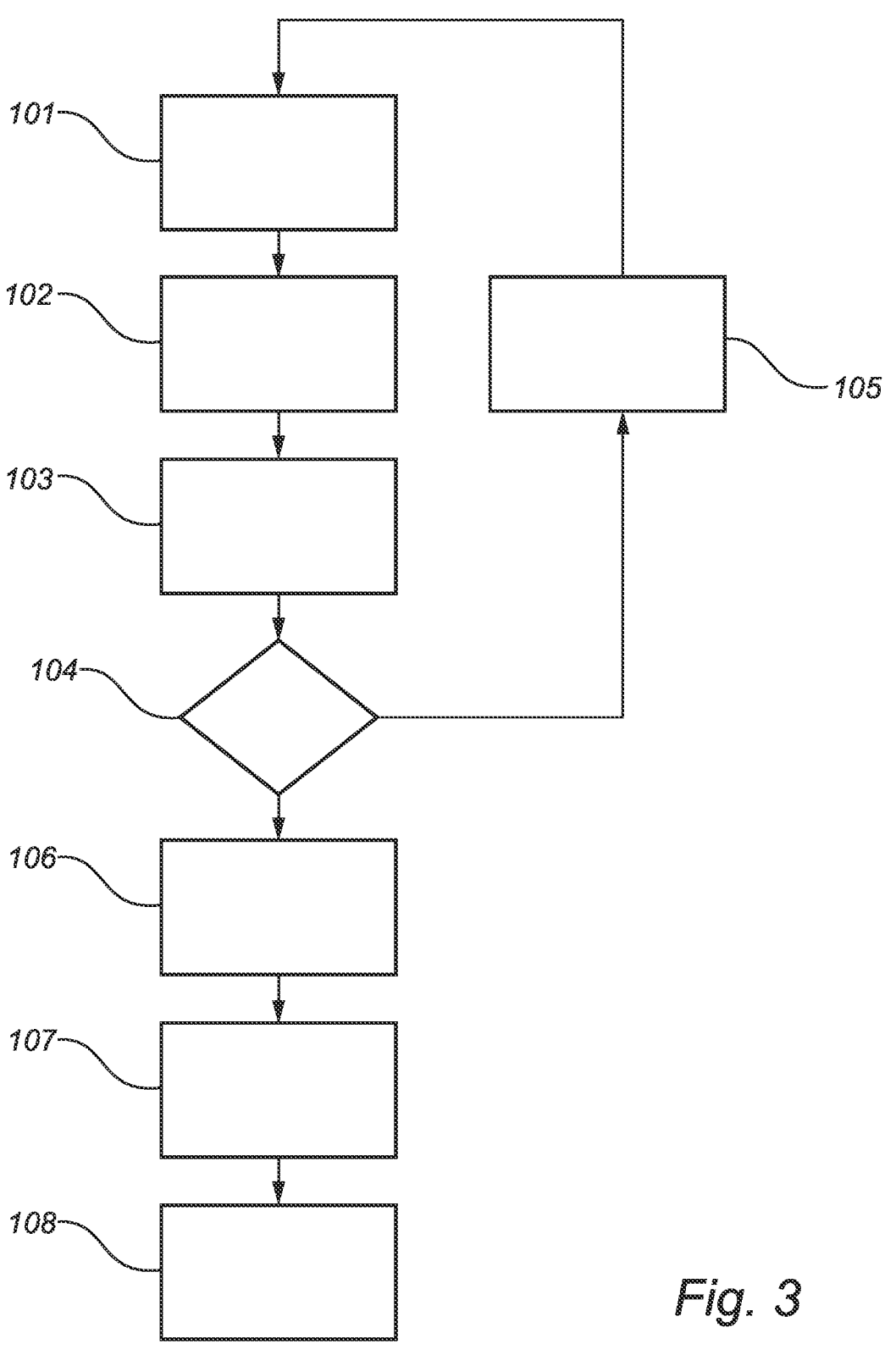
FIG. 3 is a flowchart illustrating a first example embodiment of the method according to the present invention.

FIG. 3 is a flowchart illustrating a first example embodiment of the method according to the present invention. Referring to FIG. 3, the method involves performing a first sequence of a predefined first number $N_1$ of distance data acquisition operations. Consecutive distance data acquisition operations are separated in time by a predefined first separation time period $T_1$. In each distance data acquisition operation an electromagnetic transmit signal $S_T$ exhibiting a time-varying frequency is generated and transmitted 101 towards the target 3, by the transceiver 11 comprised in the vibration estimation system 1. An electromagnetic reflection signal $S_R$ resulting from reflection of the transmit signal $S_T$ at the target 3 is received 101 by the transceiver 11. A measurement signal is formed 102 by the signal processing circuitry 13 comprised in the vibration estimation system 1. The measurement signal is indicative of a difference between the transmit signal $S_T$ and the reflection signal $S_R$. In embodiments, the measurement signal may be the so-called intermediate frequency signal $S_{IF}$ referred by above. The signal processing circuitry provides and stores 103 a measurement data set in the memory 15 comprised in the vibration estimation system. The measurement data set is a representation of the measurement signal, and may, for example, be sampled values of the measurement signal, or a data set being a result of further processing of sampled values of the measurement signal. Such further processing may, for example, include, per se, known FFT processing procedures.

After having stored the measurement data set in the memory 15, the method proceeds to determine 104 if the first number $N_1$ of distance data acquisition operations has been performed or not. If the latest distance data acquisition operation has a sequence number n that is less than the first number $N_1$, a counter may be incremented 105, and the next distance data acquisition operation may commence. If the latest distance data acquisition operation has a sequence number n that is equal to the first number $N_1$, the first sequence of distance data acquisition operations is finished, and the method proceeds to access 106 from the memory 15 comprised in the vibration estimation system 1, by the processing circuitry 7 comprised in the vibration estimation system 1, the measurement data set for each distance data acquisition operation of the first number $N_1$ of distance data acquisition operations.

Based on the measurement data set for each distance data acquisition operation of the first number $N_1$ of distance data acquisition operations, the processing circuitry 7 determines 107 a first sequence of distance variation values indicative of a variation over time of a distance between the vibration estimation system 1, such as the antenna arrangement 9, and the target 3. Thereafter, the processing circuitry 7 estimates 108 a first indicator of the vibration of the target 3 based on the first sequence of distance variation values. Depending on the form of the first indicator of the vibration of the target 3, the estimation may additionally be based on the first separation time period $T_1$.

FIG. 4A schematically illustrates the time-varying frequency and timing of exemplary transmit signals $S_T$ of the first sequence of distance data acquisition operations. Each transmit signal is a so-called frequency chirp 17, which in this case exhibits a linearly increasing frequency during a chirp time $t_c$. As would be well known by one of ordinary skill in the art, the frequency variation over time need not be linear, and need not be increasing. Also, the frequency variation over time may be continuous or stepped. Each chirp 17 represents a distance data acquisition operation, and, as is schematically illustrated in FIG. 4A, the time between the beginning of consecutive chirps 17 is the above-mentioned first separation time T1. As is well-known for so-called FMCW-radar techniques, each chirp 17 allows the formation of a measurement signal, often referred to as an intermediate frequency signal, from which a determination of the current distance to the target 3 can be made. Accordingly, each chirp 17 can be seen as a sample of a measure of the distance to the target 3. The measure of the distance to the target 3 may include a measure of the absolute distance to the target 3 and/or a measure of the distance change in relation to that given by the preceding sample. For vibration estimation, the absolute distance to the target 3 may be of interest to verify that the target 3 is the correct target, and may not need to be provided with high precision. The first sampling frequency $f_{s1}$, which is given by $1/T_1$, determines the highest frequency of the vibration of the target 3 that can be accurately estimated based on the first sequence of distance data acquisition operations. The limited first number $N_1$ of distance data acquisition operations, on the other hand, limits the lowest frequency of the vibration of the target 3 that can be accurately estimated based on the first sequence of distance data acquisition operations.

FIG. 4B schematically illustrates a frequency range 19 where the first sequence of distance data acquisition operations can provide accurate vibration estimation. As is indicated in FIG. 4B, the frequency range 19 is bounded by a minimum frequency $f_{min,1}$, that is related to the first number $N_1$ of distance data acquisition operations, and a maximum frequency $f_{max,1}$, which is half the first sampling frequency $f_{s1}/2$, as given by the Nyquist theorem. The minimum frequency $f_{min,1}$ can be approximated by the relation $f_{min,1} \approx 1/N_1 T_1$.

FIG. 4C schematically shows an example of a first indicator of the vibration of the target 3, determined based on the first sequence of distance data acquisition operations. The example of the first indicator in FIG. 4C is a vibration frequency spectrum, illustrating the vibration amplitude A of the target 3 as a function of the vibration frequency f. As is shown in FIG. 4C, a vibration frequency component 21 is within the frequency range 19 where the first sequence of distance data acquisition operations can provide accurate vibration estimation. Outside this range 19, no measurement data is shown, as it can be expected to be inaccurate. In particular, measurement data for frequencies lower than $f_{min,1}$ can be expected to be inaccurate, and measurement data for frequencies higher than $f_{max,1}$ will be "folded" down to the wrong frequency. The latter is a well-known consequence of undersampling. It should, however, be noted that the first sequence of distance data acquisition operations can provide some information of, for example, the presence of vibrations with frequencies lower than the frequency range 19, and that such information may be used to dynamically adapt the measurement parameters, in particular the number of distance data acquisition operations in a sequence, and/or the separation time. The indicator of the vibration of the target 3 in FIG. 4C is a vibration spectrum, with the amplitude of the vibration as a function of the frequency of the vibration. There are many other indicators that can be estimated based on the first sequence of distance variation values, that may be of greater interest, depending on the application and/or the requirements of the user of the vibration estimation system. Examples of such indicators may include the acceleration (rms and/or maximum) of the target 3, the speed (rms and/or maximum) of the target 3, the amplitude (rms and/or maximum) of the vibration of the target 3, the acceleration (maximum and frequency of maximum, or as a spectrum of the acceleration as a function of vibration frequency), the speed (maximum and frequency of maximum, or as a spectrum of the speed as a function of vibration frequency), or the amplitude (maximum and frequency of maximum).

As was indicated above, the first sequence of distance data acquisition operations may have provided an accurate estimation of the vibration of the target 3 within a certain frequency range 19. To get a more complete estimation of the vibration of the target 3, it may be desirable to achieve an accurate estimation in another frequency range, that is different from the frequency range 19 for the first sequence of distance data acquisition operations.

Figure 5:
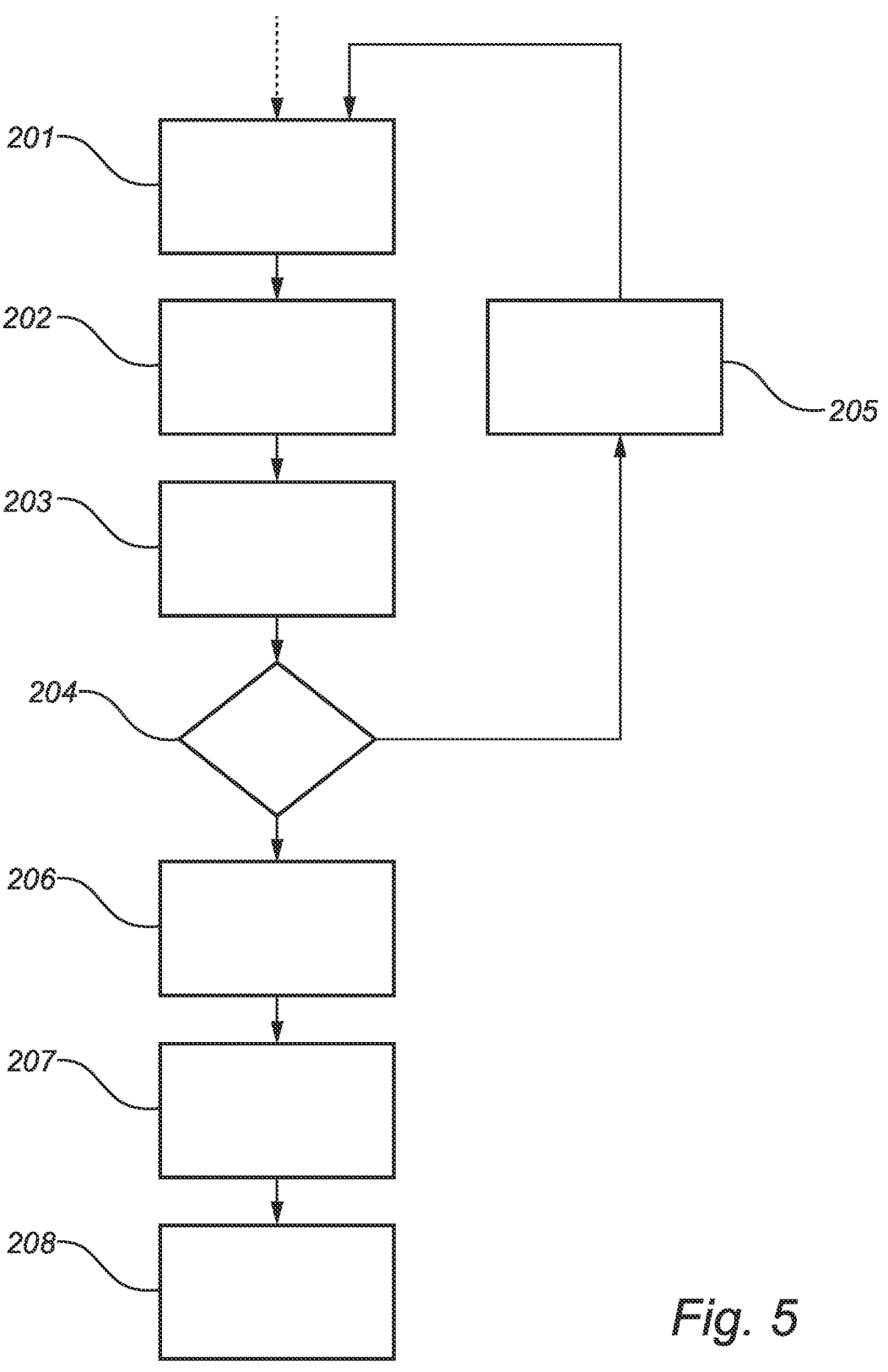
FIG. 5 is a flowchart illustrating additional steps in a second example embodiment of the method according to the present invention.

FIG. 5 is a flowchart illustrating additional steps in a second example embodiment of the method according to the present invention. The dashed arrow at the top of the flowchart in FIG. 5 indicates that the steps in the flowchart in FIG. 3 have been previously performed.

Referring to FIG. 5, these additional steps involve performing a second sequence of a second number $N_2$ of distance data acquisition operations. Consecutive distance data acquisition operations are now separated in time by a second separation time $T_2$. The second number $N_2$ and/or the second separation time $T_2$ may be predefined, or dynamically determined based on an analysis of the result of the vibration estimation performed based on the first sequence of distance data acquisition operations. The distance data acquisition operations illustrated by the steps 201-205 may be performed as described above with reference to the steps 101-105 of the flowchart in FIG. 3.

Based on the measurement data set for each distance data acquisition operation of the second number $N_2$ of distance data acquisition operations, the processing circuitry 7 determines 207 a second sequence of distance variation values indicative of a variation over time of a distance between the vibration estimation system 1, such as the antenna arrangement 9, and the target 3. Thereafter, the processing circuitry 7 estimates 208 a second indicator of the vibration of the target 3 based on the second sequence of distance variation values. Depending on the form of the second indicator of the vibration of the target 3, the estimation may additionally be based on the second separation time $T_2$.

FIG. 6A schematically illustrates the time-varying frequency and timing of exemplary transmit signals $S_T$ of the second sequence of distance data acquisition operations. As for the first sequence of distance data acquisition operations, each transmit signal is a so-called frequency chirp 23, which may be identical to the frequency chirps 17 used in the first sequence of distance data acquisition operations. In embodiments, it may, however, be beneficial to use a different frequency chirp that may be dynamically determined based on the result of the vibration estimation performed based on the first sequence of distance data acquisition operations. As is schematically illustrated in FIG. 6A, the time between the beginning of consecutive chirps 23 is the above-mentioned second separation time $T_2$. In the example illustrated by FIG. 6A, the second separation time $T_2$ is longer than the first separation time $T_1$. In the present example, the second number $N_2$ may be substantially the same as the first number $N_1$, resulting in a longer total measurement time, given by the product $N_2T_2$. It should be understood that the second separation time $T_2$ may be selected to be shorter than the first separation time $T_2$ and/or that the second number may be different from the first number. For instance, for a second separation time $T_2$ longer than the first separation time $T_1$, a second number $N_2$ that is lower than the first number $N_1$ may still result in the desired longer total time of measurement (which in turn determines the minimum vibration frequency that can be accurately estimated).

FIG. 6B schematically illustrates a frequency range 25 where the second sequence of distance data acquisition operations can provide accurate vibration estimation. As is indicated in FIG. 6B, the frequency range 25 is bounded by a minimum frequency $f_{min,2}$, that is related to the second number $N_2$ of distance data acquisition operations, and a maximum frequency $f_{max,2}$, which is half the second sampling frequency $f_{s2}/2$, as given by the Nyquist theorem. The minimum frequency fmin,2 can be approximated by the relation $f_{min,2} \approx 1/N_2T_2$.

FIG. 6C schematically shows an example of a second indicator of the vibration of the target 3, determined based on the second sequence of distance data acquisition operations. The example of the second indicator in FIG. 6C is a vibration frequency spectrum, illustrating the vibration amplitude A of the target 3 as a function of the vibration frequency f. As is shown in FIG. 6C, there is a first 27 and a second 29 frequency component within the frequency range 25 where the second sequence of distance data acquisition operations can provide accurate vibration estimation. Outside this range 25, no measurement data is shown, as it can be expected to be inaccurate.

In the example of FIG. 6C, the second frequency component 29 represents real vibration of the target, but the first frequency component 27 is a "folded" version of the higher frequency component 21 in FIG. 4C, which appears as mirrored in respect of the second maximum frequency (the Nyquist frequency) $f_{max,2}$, due to undersampling.

Figure 7:
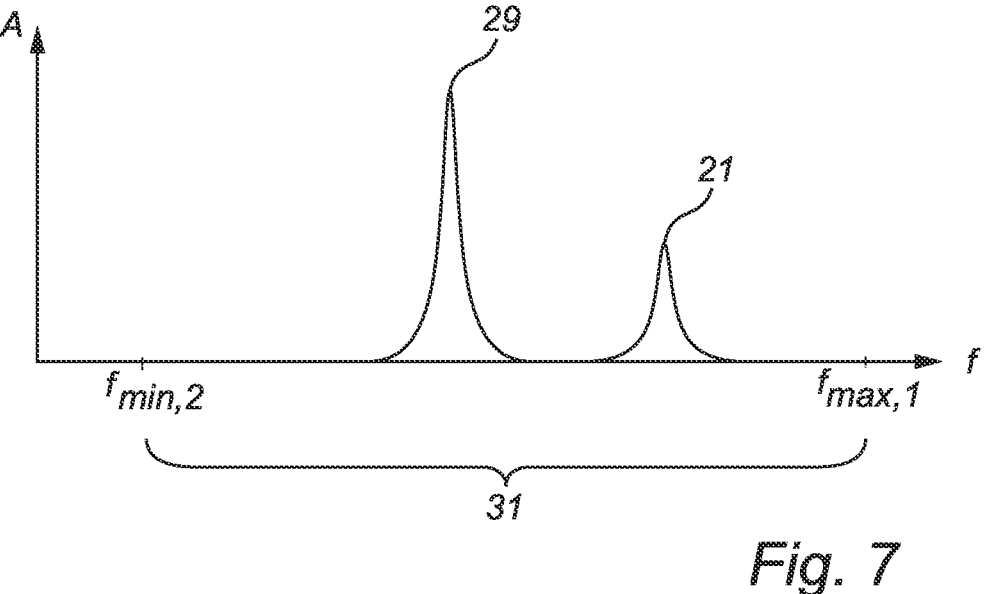
FIG. 7 schematically shows an example of a combined indicator of the vibration of the target.

FIG. 7 schematically shows an example of a combined indicator of the vibration of the target 3, based on the first sequence of distance variation values and the second sequence of distance variation values. In particular, FIG. 7 schematically shows a combined vibration frequency spectrum for the target 3, based on a first vibration frequency spectrum (in FIG. 4C) for the target determined from the first sequence of distance variation values and a second vibration frequency spectrum (in FIG. 6C) for the target determined from the second sequence of distance variation values. As is indicated in FIG. 7, the frequency range 31 within which the vibration can be correctly estimated is defined by the second minimum frequency $f_{min,2}$ and the first maximum frequency $f_{max,1}$. The combined indicator (in this case amplitude spectrum) includes the relatively high frequency component 21 estimated based on the first sequence of distance data acquisition operations, and the relatively low frequency second frequency component 29 estimated based on the second sequence of distance data acquisition operations. The first frequency component 27 estimated based on the second sequence of distance data acquisition operations has been removed using anti-aliasing.

Referring to FIG. 6C, in this example the "folded" peak 27 does not exhibit any overlap with the "real" peak 29. If the vibration estimation based on the second sequence of distance data acquisition operations results in overlap, it may be beneficial to change the second time period (that determines the Nyquist frequency for the second sequence of distance data acquisition operations, and thus the position of the "folded" peak in the frequency dimension) to separate the "folded" peak(s) from the "real" peak(s), as this simplifies anti-aliasing.

Figure 8:
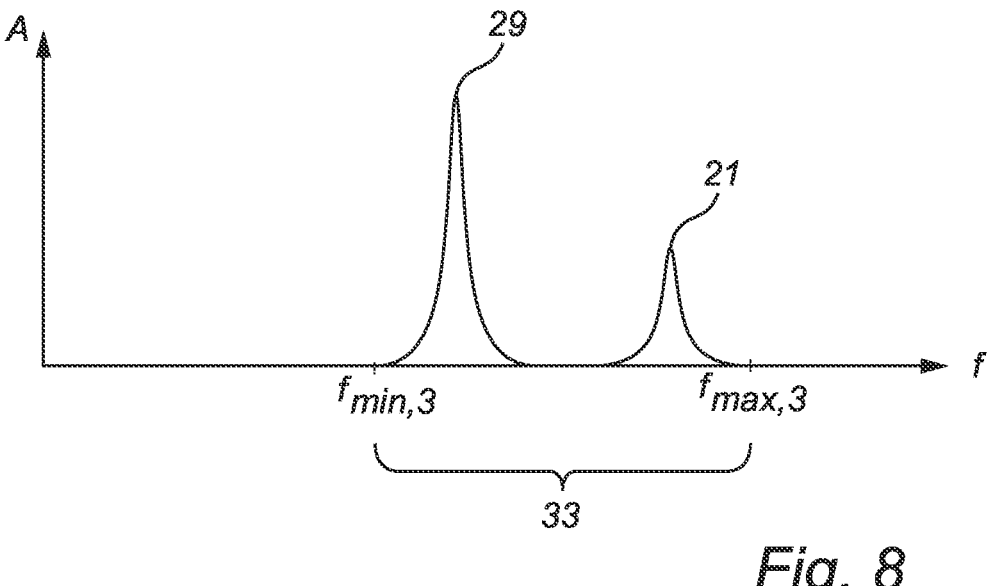
FIG. 8 schematically shows an example of a third indicator of the vibration of the target.

Following one or more vibration estimations, it may be possible to determine estimation parameters that are optimized to the vibration behavior of the target 3. For instance, the frequency range 31 in FIG. 7 may be unnecessarily broad for the vibration behavior of the target 3. By selecting a suitable separation time $T_3$ and/or a suitable number $N_3$ of distance data acquisition operations, a more energy-efficient vibration estimation can be performed, which is still accurate within the relevant frequency range. This is schematically illustrated in FIG. 8, schematically showing an example of a third indicator of the vibration of the target 3. In FIG. 8 the frequency range 33 includes both the "real" frequency components 21, 29 of the vibration of the target 3, and is bounded by a third minimum frequency $f_{min,3}$ and a third maximum frequency $f_{max,\ 3}$. The third minimum frequency $f_{min,3}$, which is related to the third number $N_3$ of distance data acquisition operations and the third separation time $T_3$, is higher than the second minimum frequency $f_{min,2}$ in FIG. 6C. The third maximum frequency $f_{max,3}$, which is half the third sampling frequency $f_{s3}/2$, as given by the Nyquist theorem, is lower than the first maximum frequency $f_{max,1}$.

Figure 9:
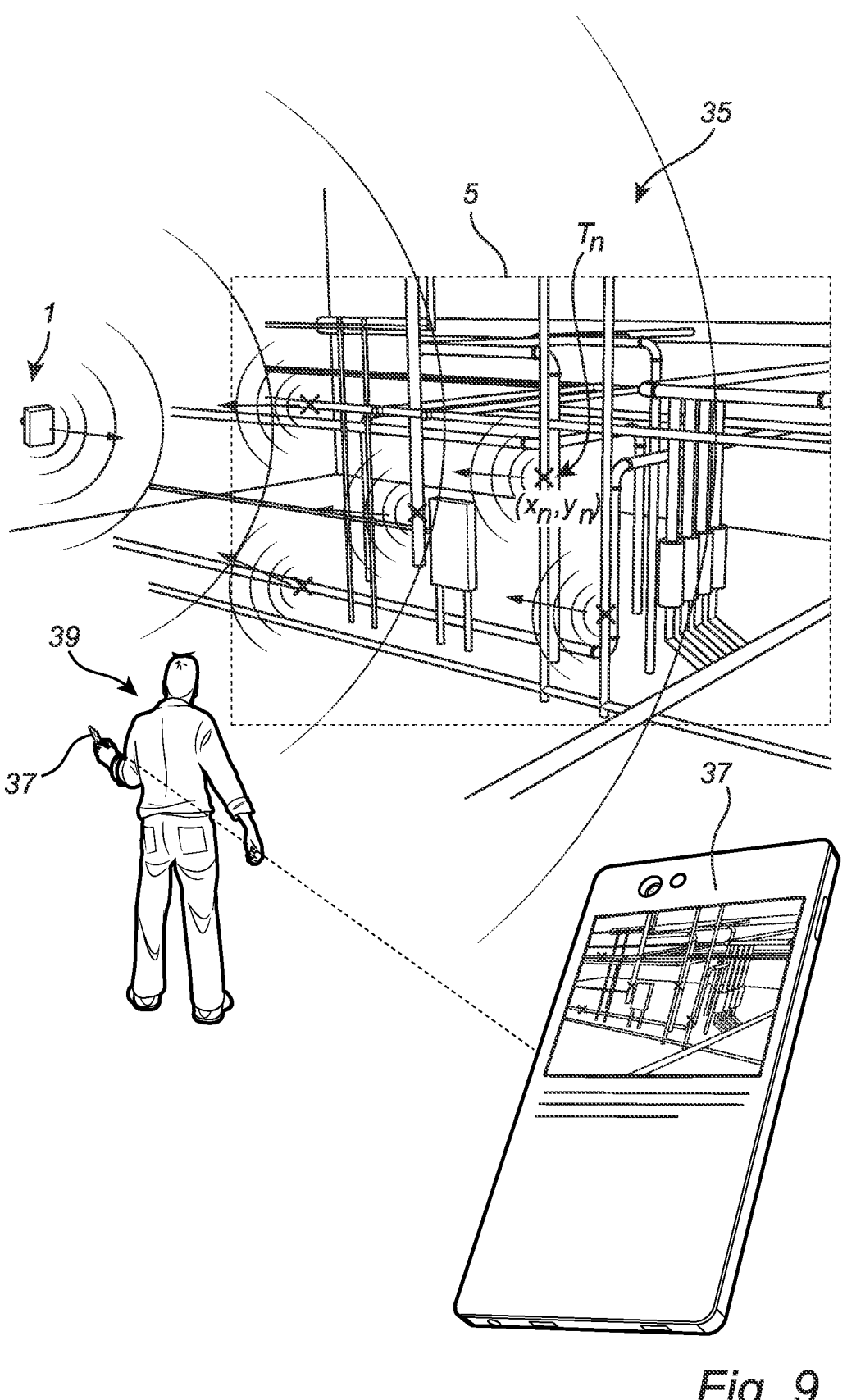
FIG. 9 schematically shows another example embodiment of the vibration estimation system according to the present invention, for estimating vibration of multiple targets.

So far, the distance to a single target 3 has been discussed. According to embodiments of the present invention, vibration of multiple targets can be estimated. FIG. 9 schematically shows an example embodiment of the vibration estimation system 1 according to the present invention, for estimating vibration of multiple targets $T_n$ FIG. 9 schematically illustrates remote monitoring of vibration in the exemplary setting of a process facility 35, which may, for example, be a factory for manufacturing chemicals, which may serve as an illustrative example of a setting where the contactless vibration estimation provided by the vibration estimation system 1 according to embodiments of the present invention may be particularly beneficial.

Referring to FIG. 9, vibration of each target $T_n$ in a plurality of targets is monitored remotely, using contactless measurement. In the example configuration of FIG. 9, a vibration indication for each target $T_n$ is provided to a remote device 37, to allow display to a user 39 of a visual representation of the process facility 35, including the targets $T_n$ and a representation of the vibration indication for each target $T_n$. Using, per se, well-known FMCW 2D FFT-processing, information about the distance to each target, as well as vibration data for each target can be obtained from a sequence (or several sequences) of distance data acquisition operations, as described so far for a single target.

In particular, forming the measurement signal in each distance data acquisition operation may include mixing the transmit signal and the reflection signal to form a mixed signal; sampling the mixed signal, resulting in a sampled data set; and performing FFT on the sampled data set, resulting in an FFT data set. From the FFT data set the targets can be resolved in range (distance), and thereafter, a vibration indication, such as a vibration spectrum, can be determined for each relevant range.

Figure 10C:
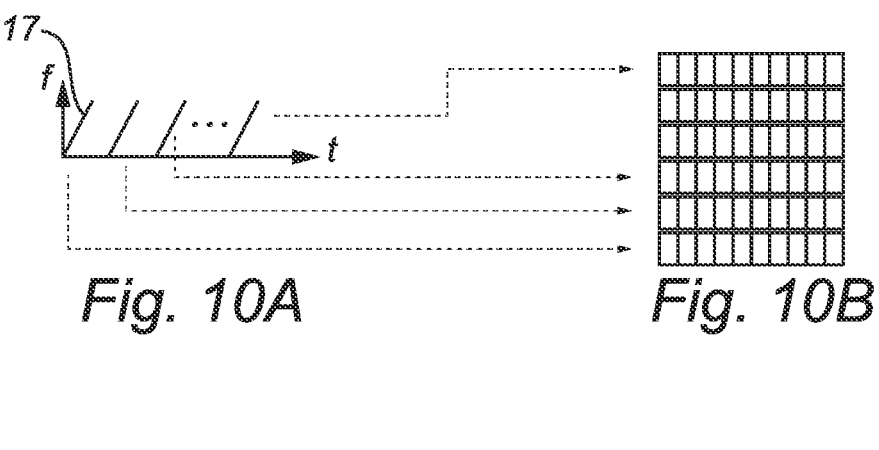
Figure 10C:
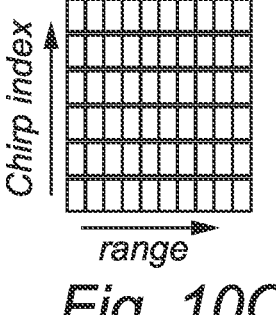
Figure 10C:
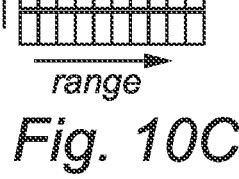
Figure 10D:
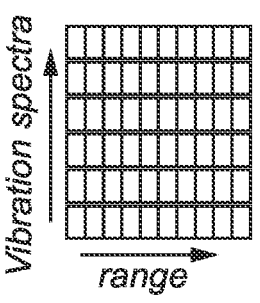

FIGS. 10A-D schematically illustrate an example of signal processing carried out in a sequence of distance data acquisition operations. Referring first to FIG. 10A, a sequence of chirps 17 is shown, as described above with reference to FIG. 4A. Samples of the measurement signals $S_{IF}$ (intermediate frequency signal) for the respective chirps may be stored as the rows of the matrix shown in FIG. 10B. Thereafter, a per se known range FFT operation may be performed on each row, to resolve the targets Tn in terms of distance (range), as is schematically shown in FIG. 10C. In the simplified representation in FIG. 10C, there are two targets at different distances, represented by the filled boxes, representing "bins". A second FFT operation may be performed, on phase measurements along a column of the matric, resulting in vibration spectra for a selected distance bin, i.e. for each identified target $T_n$. This is schematically indicated in FIG. 10D.

Figure 11:
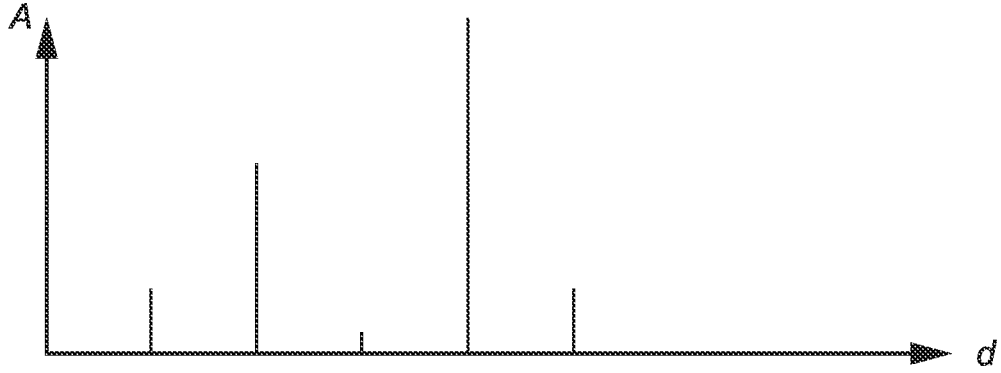
FIG. 11 schematically shows an example of indicators of the vibration of the targets in FIG. 9.

An example of resulting indicators of the vibration of the targets $T_n$ is provided in FIG. 11, in the form of a diagram of vibration amplitude as a function of distance, which each distance corresponds to a target $T_n$.

The "transceiver" of the vibration estimation system 1 may be one functional unit capable of transmitting and receiving microwave signals, or may be a system comprising separate transmitter and receiver units. It should also be noted that any processing circuitry may be provided as one device or several devices working together.

The person skilled in the art realizes that the present invention by no means is limited to the preferred embodiments described above. On the contrary, many modifications and variations are possible within the scope of the appended claims.

What is claimed is:

1. A method of estimating vibration of a target, comprising:

performing a first sequence of a predefined first number of distance data acquisition operations, consecutive distance data acquisition operations being separated by a predefined first separation time period, each data acquisition operation including:

generating and transmitting towards the target, by a transceiver comprised in a vibration estimation system, an electromagnetic transmit signal exhibiting a time-varying frequency;

receiving, by the transceiver comprised in the vibration estimation system, an electromagnetic reflection signal resulting from reflection of the transmit signal at the target;

forming, by signal processing circuitry comprised in the vibration estimation system, a measurement signal indicative of a difference between the transmit signal and the reflection signal; and storing a measurement data set, being a representation of the measurement signal, in a memory comprised in the vibration estimation system;

accessing from the memory comprised in the vibration estimation system, by processing circuitry comprised in the vibration estimation system after having performed the first number of distance data acquisition operations, the measurement data set for each distance data acquisition operation of the first number of distance data acquisition operations;

determining, by the processing circuitry comprised in the vibration estimation system, a first sequence of distance variation values indicative of a variation over time of a distance between the vibration estimation system and the target, based on the measurement data set for each distance data acquisition operation of the first number of distance data acquisition operations;

performing a second sequence of a second number of distance data acquisition operations, consecutive distance data acquisition operations being separated by a predefined second separation time period, different from the first separation time period, each data acquisition operation including:

generating and transmitting towards the target, by the transceiver comprised in the vibration estimation system, an electromagnetic transmit signal exhibiting a time-varying frequency;

receiving, by the transceiver comprised in the vibration estimation system, an electromagnetic reflection signal resulting from reflection of the transmit signal at the target;

forming, by the signal processing circuitry comprised in the vibration estimation system, a measurement signal indicative of a difference between the transmit signal and the reflection signal; and storing a measurement data set, being a representation of the measurement signal, in the memory comprised in the vibration estimation system;

accessing from the memory comprised in the vibration estimation system, by the processing circuitry comprised in the vibration estimation system after having performed the second number of distance data acquisition operations, the measurement data set for each distance data acquisition operation of the second number of distance data acquisition operations;

determining, by the processing circuitry comprised in the vibration estimation system, a second sequence of distance variation values indicative of a variation over time of a distance between the transceiver and the target, based on the measurement data set for each distance data acquisition operation of the second number of distance data acquisition operations; and estimating, by the processing circuitry comprised in the vibration estimation system, a combined indicator of the vibration of the target based on the first sequence of distance variation values and the second sequence of distance variation values.

2. The method according to claim 1, wherein the first indicator of the vibration of the target is a first vibration frequency spectrum for the target.

3. The method according to claim 1, the second separation time period being longer than the first separation period.

4. The method according to claim 1, comprising:

determining, by the processing circuitry comprised in the vibration estimation system, a combined vibration frequency spectrum for the target, based on a first vibration frequency spectrum for the target determined from the first sequence of distance variation values and a second vibration frequency spectrum for the target determined from the second sequence of distance variation values.

5. The method according to claim 4, wherein determining the combined vibration spectrum comprises performing anti-aliasing on the second vibration spectrum using the first vibration spectrum and a folding frequency being related to the second separation time period.

6. The method according to claim 1, comprising:

determining a third separation time period based on the first indicator of the vibration of the target;

performing a third sequence of a predefined third number of distance data acquisition operations, consecutive distance data acquisition operations being separated by the third separation time period, each data acquisition operation including:

generating and transmitting towards the target, by the transceiver comprised in the vibration estimation system, an electromagnetic transmit signal exhibiting a time-varying frequency;

receiving, by the transceiver comprised in the vibration estimation system, an electromagnetic reflection signal resulting from reflection of the transmit signal at the target;

forming, by the signal processing circuitry comprised in the vibration estimation system, a measurement signal indicative of a difference between the transmit signal and the reflection signal; and storing a measurement data set, being a representation of the measurement signal, in the memory comprised in the vibration estimation system;

accessing from the memory comprised in the vibration estimation system, by the processing circuitry comprised in the vibration estimation system after having performed the third number of distance data acquisition operations, the measurement data set for each distance data acquisition operation of the third number of distance data acquisition operations;

determining, by the processing circuitry comprised in the vibration estimation system, a third sequence of distance variation values indicative of a variation over time of a distance between the transceiver and the target, based on the measurement data set for each distance data acquisition operation of the third number of distance data acquisition operations; and estimating, by the processing circuitry comprised in the vibration estimation system, a third indicator of the vibration of the target based on the third sequence of distance variation values.

7. The method according to claim 1, wherein forming the measurement signal indicative of the difference between the transmit signal and the reflection signal comprises:

mixing the transmit signal and the reflection signal to form a mixed signal;

sampling the mixed signal, resulting in a sampled data set; and performing FFT on the sampled data set, resulting in an FFT data set.

8. The method according to claim 1, comprising:

determining, by the vibration estimation system, a distance between the transmitter and the target, based on the measurement signal of at least one of the distance data acquisition operations.

9. The method according to claim 8, comprising:

determining, by the vibration estimation system, a distance between the transmitter and each target of a plurality of targets, based on the measurement signal of at least one of the distance data acquisition operations.

10. The method according to claim 9, comprising:

for each target in the plurality of targets:

determining, by the processing circuitry comprised in the vibration estimation system, a first sequence of distance variation values indicative of a variation over time of a distance between the transceiver and each target in the plurality of targets, based on the measurement data set for each distance data acquisition operation of the first number of distance data acquisition operations; and estimating, by the processing circuitry comprised in the vibration estimation system, a first indicator of the vibration of each target in the plurality of targets based on the first sequence of distance variation values.

11. A vibration estimation system, for estimating vibration of a target, the vibration estimation system comprising:

distance data acquisition circuitry, including:

a transceiver configured to generate and transmit an electromagnetic transmit signal exhibiting a time-varying frequency, and to receive an electromagnetic reflection signal resulting from reflection of the transmit signal at the target;

signal processing circuitry configured to form a measurement signal indicative of a difference between the transmit signal and the reflection signal; and a memory configured to store a measurement data set, being a representation of the measurement signal, the vibration estimation system further comprising:

processing circuitry configured to:

control the distance data acquisition circuitry to perform a first sequence of a predefined first number of distance data acquisition operations, consecutive distance data acquisition operations being separated by a predefined first separation time period;

access from the memory, the measurement data set for each distance data acquisition operation of the first number of distance data acquisition operations;

determine a first sequence of distance variation values indicative of a variation over time of a distance between the transceiver and the target, based on the measurement data set for each distance data acquisition operation of the first number of distance data acquisition operations;

control the distance data acquisition circuitry to perform a second sequence of a predefined second number of distance data acquisition operations, consecutive distance data acquisition operations being separated by a predefined second separation time period, different from the first separation time period;

access from the memory, the measurement data set for each distance data acquisition operation of the second number of distance data acquisition operations;

determine a second sequence of distance variation values indicative of a variation over time of the distance between the transceiver and the target, based on the measurement data set for each distance data acquisition operation of the second number of distance data acquisition operations; and estimate a combined indicator of the vibration of the target based on the first sequence of distance variation values and the second sequence of distance variation values.

12. The vibration estimation system according to claim 11, the signal processing circuitry being configured to:

mix the transmit signal and the reflection signal to form a mixed signal;

sample the mixed signal, resulting in a sampled data set; and perform FFT on the sampled data set, resulting in an FFT data set.

* * * * *